United States Patent Office

2,714,124
Patented July 26, 1955

2,714,124

MANUFACTURE OF OCTACHLOROCYCLO-PENTENE

Aylmer Henry Maude and David Solomon Rosenberg, Niagara Falls, N. Y., assignors to Hooker Electrochemical Company, Niagara Falls, N. Y., a corporation of New York No Drawing. Application March 20, 1951,
Serial No. 216,652

9 Claims. (Cl. 260—648)

The present invention relates to the manufacture of chlorine containing organic compounds by catalytic methods, and is more particularly concerned with preparing octachlorocyclopentene by the chlorination of polychloropentanes in the presence of porous surface active catalysts.

Octachlorocyclopentene is a valuable organic compound which is useful as such because it liberates free chlorine at elevated temperatures with the accompanying formation of diolefinic structure, which property is desirable in connection with the purification of molten metals wherein chlorine is the primary purification agent. The reactive double bonds also aid in such purification. The compound is also useful as a chemical intermediate in various industries including the dyestuffs, plastics and insecticide industries, and is particularly suitable as the raw material for producing hexachlorocyclopentadiene by the known process which gives substantially quantitative yields of hexachlorocyclopentadiene by heating octachlorocyclopentene at temperatures of about 500 degrees centigrade in the absence of a catalyst.

An object of the present invention is to provide a method whereby octachlorocyclopentene is economically produced from polychloropentanes. Another object of the present invention is to provide a thermal catalytic method for the preparation of octachlorocyclopentene which does not involve substantial amounts of chlorinolysis. An additional object of the present invention is to provide a method for the preparation of octachlorocyclopentene from inexpensive, commercially available raw materials. Other objects will become apparent to those skilled in the art.

We have now found that octachlorocyclopentene can be prepared by a method which comprises continually introducing polychloropentanes having an average chlorine content of more than two atoms per molecule, with chlorine into a reaction zone containing a porous surface active catalyst maintained at a temperature between about 280 degrees and 550 degrees centigrade. We have found that octachlorocyclopentene can be prepared in yields up to 95 per cent of theory by this method.

The following examples are given to illustrate the practice of the present invention but are not to be construed as limiting.

*Example 1*

One mol of polychloropentanes having an approximate average composition of $C_5H_5Cl_7$ and a specific gravity of about 1.67, produced in a photochemical chlorinator according to the procedure described in United States Patent Number 2,473,162, was, vaporized, mixed with 5.14 mols of elemental chlorine, and passed into a reaction zone containing about 228 cubic centimeters of a porous surface active catalyst comprising synthetic fused alumina impregnated with about twenty-five per cent by weight of cobalt chloride, per gram mol of gaseous feed per hour. The reactants were in contact with the catalyst for a period of about eight seconds in the reaction zone which was maintained at a temperature of between about 380 and 480 degrees centigrade. The gaseous organic effluent from the reaction zone was condensed and found to contain 91.0 mol per cent octachlorocyclopentene and 9.0 mol per cent of other chlorinated organic products.

*Example 2*

A gaseous mixture containing one mol of polychloropentanes similar in composition to the organic reactant in Example 1, and 4.73 mols of chlorine was passed in contact with a porous surface active catalyst comprising activated bauxite which was acid extracted and then diluted with three parts of an inert solid diluent, in a reaction zone maintained at a temperature of about 280 degrees centigrade. The volume of catalyst contained in the reaction zone was about 90 cubic centimeters per gram mol of gaseous feed per hour. The reactants were contacted with the catalyst in the reaction zone for a period of about 5.6 seconds, and the resultant organic gaseous effluent was condensed and recovered. Eighty-nine and five-tenths mol per cent octachlorocyclopentene was produced with the remaining percentage consisting of other chlorinated organic products.

*Example 3*

Chlorine and polychloropentanes, similar to that used in the foregoing examples, in a mol ratio of about 5.53 to one, respectively, were contacted in the gaseous phase, at a temperature of about 380 degrees centigrade, with 288 cubic centimeters per gram mol of gaseous feed per hour of a porous surface active catalyst comprising silica gel. The reactants were retained in contact with the catalyst for a period of about eleven seconds. The gaseous organic effluent from the reaction zone was condensed and on distillation was found to contain 55 mol per cent of octachlorocyclopentene and less than eight mol per cent of chlorinolysis products.

*Example 4*

In a manner after the foregoing examples, chlorine and polychloropentanes, in a mol ratio of about 3.87 to one, respectively, were contacted with 106 cubic centimeters per gram mol of gaseous feed per hour, of activated fuller's earth or floridin. The temperature of the catalytic zone was maintained at about 350 degrees centigrade and the retention time of the reactants with the catalyst in said zone was about six seconds. Sixty-nine and six-tenths mol per cent octachlorocyclopentene was recovered.

*Example 5*

In a manner after the foregoing example, chlorine and polychloropentanes, in a mol ratio of about 5.38 to one, respectively, were contacted with 136 cubic centimeters per gram mol of gaseous feed per hour, of activated carbon impregnated with cobalt chloride. The temperature of the catalytic zone was maintained at about 330 degrees centigrade and the retention time of the reactants with the catalyst in said zone was about 5.4 seconds. Sixty mol per cent octachlorocyclopentene was recovered.

The preparation of the starting polychloropentanes employed in conducting our process is advantageously accomplished according to the procedure described in Patent Number 2,473,162. Thus, a commercial mixture of pentanes can readily be photochemically chlorinated to yield a product averaging about $C_5H_5Cl_7$, which is suitable for use in our process. It is to be noted that the patented process yields a mixture of chloropentanes, hydrogen chloride, and unreacted chlorine at about 90 degrees centigrade, for example, which can be used directly without cooling or fractionation. The exact ratios of hydrogen and chlorine in the starting polychloropentanes is not critical, but is preferably of the order of $H_3$ to $H_7$ and, conversely, $Cl_9$ to $Cl_5$. Partially chlorinated cyclic $C_5$ compounds may be employed as starting materials, as $C_5H_4Cl_6$ (hexachlorocyclopentane) or $C_5H_2Cl_6$ (hexachlorocyclopentene). Any $C_5$ chlorohydrocarbon containing more than two and preferably above five chlorine atoms may be employed in practicing our invention.

The temperatures in the catalytic reaction zone are important and must be maintained between 280 degrees centigrade and 550 degrees centigrade. Below 280 degrees centigrade chlorination and cyclization fall off rapidly, and above about 550 degrees centigrade condensation to ten carbon atoms chloro carbons of empirical formula $C_{10}Cl_8$ occurs to a marked extent. This material having the empirical formula $C_{10}Cl_8$ is believed by us to be a new composition of matter. The most desirable temperature for any particular starting material is that low enough for a minimum of condensation and high enough to minimize the quantity of hydrogen-containing organic products.

The undesirable effects of localized overheating in the catalytic reaction zone, whereby condensation is effected, are minimized by diluting the gaseous reactants introduced into the catalytic zone with an inert diluent. Hydrogen chloride concomitantly produced with the polychloropentanes may be used as an effective diluent for this purpose without effecting hydrochlorination of the olefinic bond in the desired product.

The surface active catalysts employed in the reaction zone may be activated in accord with Patent Numbers 2,079,854 or 2,191,592; however, other modes of activation have been found useful for giving enhanced results in accordance with this invention. In general, materials best suited are selected from the group of silica gel, bauxite, acid-extracted bauxite, active carbon, kieselguhr brick and acid-extracted kieselguhr brick, floridin, attapulgite, synthetic fused alumina, and other similar materials and diatomaceous earths, whether naturally or artifically activated, either impregnated with metallic salts or otherwise, are useful in accordance with this invention. These solids all have extensive surface areas and are substantially unaffected chemically during their life in the reaction zone. They tend to become ineffective in use, probably due to reduction in porosity, and must be periodically reactivated or replaced by fresh material. In general, the low cost of such solids renders it uneconomic to regenerate them when spent, but this can be done if desired.

The surface active catalysts may be advantageously impregnated with the chloride salts of various metals, for example, iron, cobalt, or nickel, which are metals of group VIII of the periodic table, whereby enhanced yields of octachlorocyclopentene may be obtained. For example, twenty per cent by weight of cobalt chloride on floridin has been found very satisfactory in practicing our invention. The metallic halide impregnated surface active catalysts are prepared simply by soaking the surface active catalysts in a solution of the desired metallic halide and drying, the exact amount of such chloride being retained thereon being unimportant for successful results in accordance with this invention.

It is desirable to provide about 200 cubic centimeters of porous surface active catalyst per gram mol of vapor fed into the catalytic reaction zone per hour. The solid catalyst is packed loosely in the reaction zone and is preferably of such particle size that the pressure due to resistance to flow of gases is not excessive. Alternatively, instead of packing the catalyst in the reaction zone, it may be employed in the "fluidized" condition, and in such cases will then be of small particle size or on a supported bed.

Our invention has been described herein with reference to certain specific embodiments thereof; however, we do not intend to be limited thereto except as defined in the appended claims.

We claim:

1. The method which includes: maintaining a reaction zone containing a solid porous surface active catalyst at a temperature between about 280 degrees and about 550 degrees centigrade; passing a $C_5$ chlorohydrocarbon containing hydrogen and more than two chlorine atoms per molecule, and chlorine into said zone; maintaining the reaction mixture in the vapor phase; and separating octachlorocyclopentene from the gaseous effluent so produced.

2. The method of claim 1 wherein the $C_5$ chlorohydrocarbon is a mixture of polychloropentanes averaging above five chlorine atoms per molecule.

3. The method of claim 1 wherein the catalyst is impregnated with a metallic chloride, the metal of which is selected from the group consisting of cobalt, nickel and iron.

4. The method of claim 1 wherein the catalyst is a fuller's earth.

5. The method of claim 4 wherein the fuller's earth is pressure activated.

6. The method of claim 1 wherein the catalyst is silica gel.

7. The method of claim 1 wherein the catalyst is acid-extracted activated bauxite.

8. The method of claim 1 wherein the catalyst is synthetic fused alumina impregnated with cobalt chloride.

9. The method of claim 1 wherein the catalyst is activated carbon impregnated with cobalt chloride.

References Cited in the file of this patent

UNITED STATES PATENTS

| | | |
|---|---|---|
| 1,947,491 | Reilly | Feb. 20, 1934 |
| 2,281,096 | Engs et al. | Apr. 28, 1942 |

OTHER REFERENCES

McBee et al.: "Industrial and Engineering Chemistry," vol. 33, pages 181–5 (1941).

Fruhwirth: "Ber. der deut. chem. Gesell.," vol. 74, pages 1700–1 (1941).